US 9,518,837 B2

(12) United States Patent
Fowe

(10) Patent No.: US 9,518,837 B2
(45) Date of Patent: Dec. 13, 2016

(54) MONITORING AND VISUALIZING TRAFFIC SURPRISES

(71) Applicant: HERE Global B.V., Veldhoven (NL)

(72) Inventor: James Fowe, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/558,401

(22) Filed: Dec. 2, 2014

(65) Prior Publication Data
US 2016/0153804 A1 Jun. 2, 2016

(51) Int. Cl.
*G01C 21/36* (2006.01)
*G08G 1/01* (2006.01)

(52) U.S. Cl.
CPC ......... *G01C 21/3697* (2013.01); *G08G 1/0104* (2013.01)

(58) Field of Classification Search
CPC ................ G01C 21/3697; G08G 1/0104
USPC ........................................ 701/118
See application file for complete search history.

(56) References Cited

U.S. PATENT DOCUMENTS

| | | | |
|---|---|---|---|
| 6,317,686 B1 * | 11/2001 | Ran | G01C 21/3691 701/117 |
| 7,460,948 B2 * | 12/2008 | Van Buer | G08G 1/0104 701/117 |
| 7,519,564 B2 | 4/2009 | Horvitz | |
| 7,864,751 B2 | 1/2011 | Greenberg | |
| 7,899,611 B2 * | 3/2011 | Downs | G08G 1/0104 701/117 |
| 7,899,612 B2 | 3/2011 | Kumagai et al. | |
| 8,103,435 B2 | 1/2012 | Yang et al. | |
| 8,483,940 B2 | 7/2013 | Chapman et al. | |
| 8,615,354 B2 * | 12/2013 | Barker | G08G 1/0104 701/117 |
| 8,700,294 B2 | 4/2014 | Downs et al. | |
| 8,897,948 B2 * | 11/2014 | Caveney | G08G 1/0104 340/438 |
| 9,047,773 B2 * | 6/2015 | Chen | G08G 1/096741 |
| 2002/0147541 A1 * | 10/2002 | Trovato | G08G 1/0104 701/117 |

(Continued)

FOREIGN PATENT DOCUMENTS

| | | |
|---|---|---|
| CN | 103412975 | 11/2013 |
| JP | 2005242424 A * | 9/2005 |

OTHER PUBLICATIONS

Mentor Products, Inc., "The Laws of Algebra", Google Date: Mar. 1, 2003, 4 pages, downloaded from http://mentorproducts.com/laws2.html.*

(Continued)

*Primary Examiner* — Behrang Badii
*Assistant Examiner* — David Testardi
(74) *Attorney, Agent, or Firm* — Lempia Summerfield Katz LLC

(57) ABSTRACT

Systems, methods, and apparatuses are described for monitoring and visualizing traffic surprises. Traffic data is received for a region of interest comprising one or more routes. A surprise factor may be calculated for one or more routes in the region of interest based on a ratio of historical traffic data and real-time traffic data. A comparison may be performed of the surprise factor to at least one threshold. A surprise traffic message may be generated based on the comparison.

17 Claims, 12 Drawing Sheets

(56) References Cited

U.S. PATENT DOCUMENTS

| | | | | |
|---|---|---|---|---|
| 2004/0198339 | A1* | 10/2004 | Martin | H04W 4/06 455/423 |
| 2005/0027436 | A1* | 2/2005 | Yoshikawa | G01C 21/3617 701/117 |
| 2006/0017588 | A1* | 1/2006 | Hilliard | G08G 1/0104 340/995.13 |
| 2009/0082948 | A1* | 3/2009 | Hiruta | G08G 1/0104 701/117 |
| 2009/0117923 | A1 | 5/2009 | Berger et al. | |
| 2015/0206427 | A1* | 7/2015 | Blandin | G08G 1/0129 701/117 |
| 2015/0300835 | A1* | 10/2015 | Fowe | G01C 21/20 701/410 |

OTHER PUBLICATIONS

Wikipedia article, "Traffic flow", old revision dated Dec. 2, 2014, 22 pages.*
Asmundsdottir, Dynamic OD Matrix Estimation Using Floating Car Data, Mar. 2008, Civil Engineering Delft University of Technology.
Predictive Analytics for Traffic, Machine Learning and Intelligence for Sensing, Inferring, and Forecasting Trafic Flow, Accessed Oct. 29, 2014, Microsoft Research.
Tostes et al., From Data to Knowledge: City-Wide Traffic Flows Analysis and Prediction Using Bing Maps, 2013, Proceedings of the 2nd ACM SIGKDD International Workshop on Urban Computing.
Wood et al., Visualisation of Origins, Destinations and Flows with OD Maps, 2010, The Cartographic Journal.

* cited by examiner

400

Travel Time View

| | 1 | 2 | 3 | 4 | 5 | 6 | 7 | 8 | |
|---|---|---|---|---|---|---|---|---|---|
| 1 | X | G | | 406 | | | | | aje st |
| 2 | | X | G | | Y | | | | evanston |
| 3 | | | X | | | 408 | | | chicago |
| 4 | | R | | X | | R | | | urbana |
| 5 | | | | G | X | | | | lake st |
| 6 | | | | G | | X | | | judson |
| 7 | | Y | | | | B | X | G | indiana |
| 8 | | | G | | | | | X | kenosa |

|    | L1 | L2 | L3 | L4 | L5 | L6 | L7 | L8 | L9 |
|----|----|----|----|----|----|----|----|----|----|
| L1 | x  | 0  | 0  | 0  | 0  | 0  | 0  | 0  | 0  |
| L2 | 1  | x  | 0  | 1  | 1  | 1  | 1  | 1  | 1  |
| L3 | 1  | 0  | x  | 1  | 1  | 1  | 1  | 1  | 1  |
| L4 | 0  | 0  | 0  | x  | 1  | 1  | 1  | 0  | 0  |
| L5 | 0  | 0  | 0  | 0  | x  | 0  | 1  | 0  | 0  |
| L6 | 0  | 0  | 0  | 0  | 0  | x  | 0  | 0  | 0  |
| L7 | 0  | 0  | 0  | 0  | 0  | 0  | x  | 0  | 0  |
| L8 | 0  | 0  | 0  | 0  | 1  | 1  | 1  | x  | 0  |
| L9 | 0  | 0  | 0  | 0  | 1  | 1  | 1  | 1  | x  |

US 9,518,837 B2

MONITORING AND VISUALIZING TRAFFIC SURPRISES

FIELD

The following disclosure relates to applications for monitoring and visualizing traffic surprises, or more particularly, systems and algorithms for calculating and reporting traffic surprises from real-time traffic data and historical traffic data.

BACKGROUND

Navigation systems and devices provide traffic data, such as indicators of congestion and its impact on routes that a user may be travelling. In order to provide these features, navigation systems use geographic data that may include information about the traffic speed and traffic volume, as well as, detailed information regarding the network of roads and intersections, estimated travel times along road segments, the speed limits along roads, and other information useful for selecting one route over another.

The collection of geographic data for use in navigation systems may be a significant undertaking. Additionally, present collection systems typically model the existence of congestion and average speed on a large scale with minimal context. For example, the majority of congestion reported may be known to drivers and others who use the traffic information such as transportation planners. Traffic delays are also often reported. Traffic delays may be caused by one or more of congestion, construction, accidents, special events (e.g., concerts, sporting events, festivals), weather conditions (e.g., rain, snow, tornado), and so on.

Accordingly, end users who have navigation systems may discover that certain traffic data used in their navigation systems does not provide sufficient context. Therefore, providing up-to-date and accurate traffic data, such as for use in navigation systems, is a continuing effort.

SUMMARY

Systems, methods, and apparatuses are described for monitoring and visualizing traffic surprises. Traffic data is received for a region of interest comprising one or more routes. A surprise factor may be calculated for one or more routes in the region of interest based on a ratio of historical traffic data and real-time traffic data. A comparison may be performed of the surprise factor to at least one threshold. A surprise traffic message may be generated based on the comparison.

BRIEF DESCRIPTION OF THE DRAWINGS

Exemplary embodiments are described herein with reference to the following drawings.

FIG. 4 illustrates an example web application view of origin destination matrix coloring

DETAILED DESCRIPTION

Figure 1:
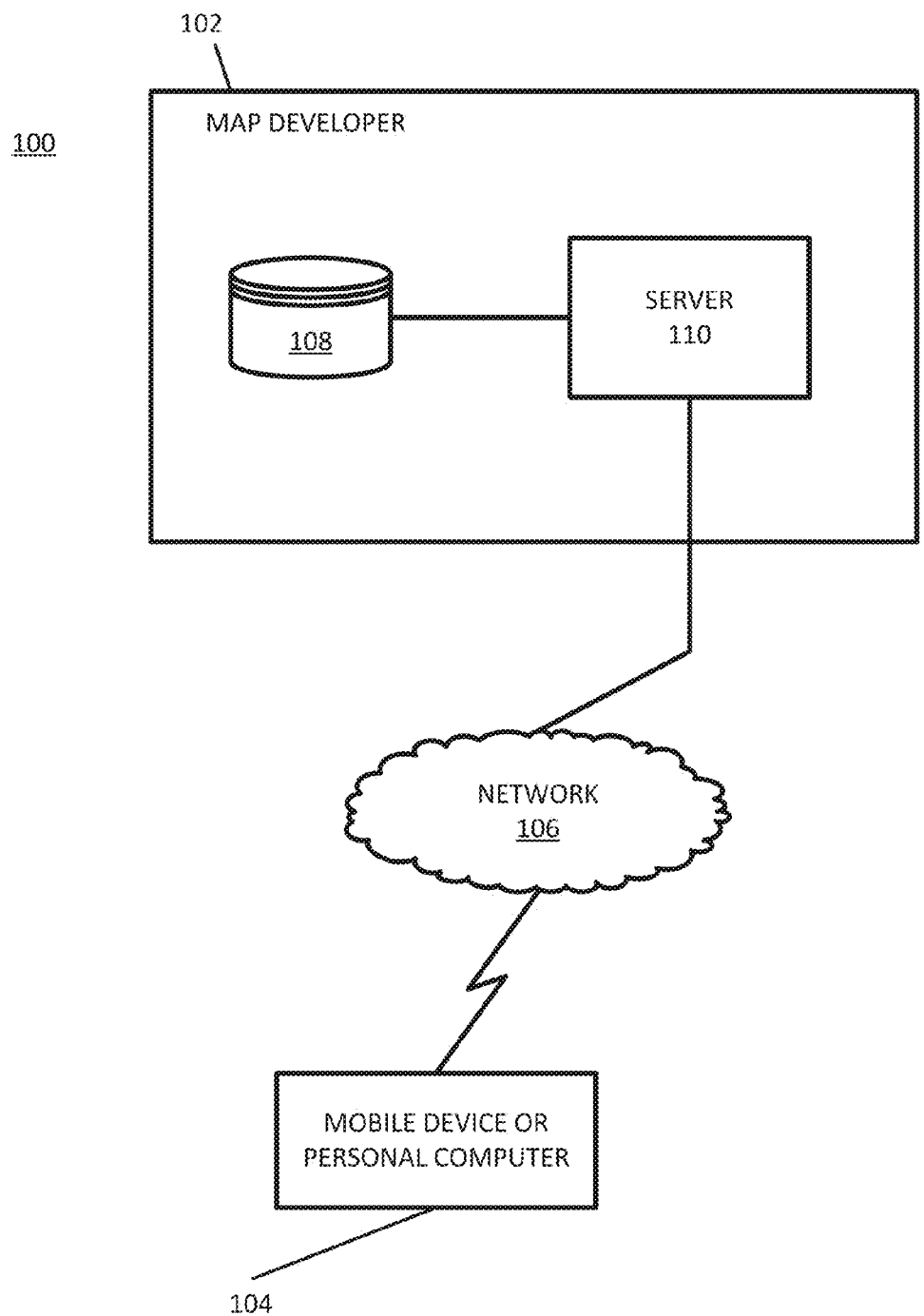
FIG. 1 illustrates an example system for monitoring and visualizing traffic surprises.

Traffic data may be provided to users from a traffic service provider (TSP). Traffic data may originate with probes. A probe may be a mobile device or tracking device that provides samples of data for the location of a vehicle. The probes may be mobile phones running specialized applications that collect location data as people drive along roads as part of their daily lives. A probe may be stationary sensor such as an inductance loop or optical detector (e.g., camera, light detection and ranging (LiDAR), or radar device). The probes may report the quantity, frequency, or speed of vehicles as they travel road segments. The road segment may be determined based on the geographical coordinates of the probe (e.g., global positioning system (GPS)).

The traffic data from probes may be presented on a map. A color coding technique may graphically represent the traffic levels on various road segments. For example, green may represent no congestion, yellow may represent slowed but flowing traffic, red may represent significantly slowed traffic, and black may represent substantially stopped traffic.

The following embodiments provide systems and methods for monitoring and visualizing traffic surprise data. A method, apparatus, and system are provided which provide traffic data to users which is anomalous, or a deviation from expected traffic patterns. Users are familiar with most congestion in areas they are concerned with, but what is more valuable to users is the existence of unexpected traffic events, so called "traffic surprises." This traffic surprise data may be processed and published to end users such that real time traffic surprises may be viewed by the end users in a contextual rich manner. The traffic surprises may be viewed alone on a map, or in an origin destination matrix, or in combination with the presentation of existing traffic conditions, such as congestion.

In one embodiment, an end user wishes to view traffic data, and uses a mobile application to open a mapping or navigation application. The mobile mapping or navigation application traffic data for a region of interest comprising one or more routes. The mapping or navigation application calculates a surprise factor for one or more routes in the region of interest based on a ratio of historical traffic data and real-time traffic data. The calculated surprise factor may be compared to at least one threshold. The mapping or navigation application may generate a surprise traffic message based on the comparison. The surprise traffic message may be an indication of traffic congestion, such as reduced average traffic speed, increased average traffic volume, or some combination thereof for the one or more routes in the region of interest. The surprise traffic message may be displayed to the end user on a mobile application, or in an origin destination matrix.

In another embodiment, a non-transitory computer readable medium is operable to execute instructions for monitoring and visualizing traffic data. The instructions when executed receive traffic data for route segments in a designated region, calculate a surprise factor for the route segments in the designated region, compare the surprise factor to at least one threshold, and generate a surprise traffic message based on the comparison.

FIG. 1 illustrates an example system 100 for monitoring and visualizing traffic surprises. The system 100 includes a developer system 102, one or more mobile devices or personal computers 104, hereinafter "mobile device", and a network 106. Additional, different, or fewer components may be provided. For example, many mobile devices 104 connect with the network 106. The developer system 102 includes a server 110 and one or more databases.

Database 108 may be a geographic database that stores traffic data collected from one or more mobile devices 104, or traffic data stored in the database 108 as part of the map developer system 102. The traffic data may include historical traffic data that are stored in a table in the database 108. Similarly, the traffic data may include real-time traffic data that are stored in a table in the database 108. The traffic data stored in the database 108 may be data related to one or more vehicles traveling along a route or routes. The traffic data may include measurements of one or more vehicles speed, may include measurements of vehicle volume on one or more routes, or other combinations thereof.

Data collected from the mobile device 104 may be sent to the server 110 through the network 106 by the mobile device 104. The server 110 receives traffic data for a region of interest comprising one or more routes. The received traffic data may be a user query for the conditions of a map that may be stored in the database 108. The conditions of the map may represent a "filter" which may be applied to the map, and changes the presentation of the map. The conditions of the map may include average traffic speed on the one or more routes. Additionally, the conditions of the map may include average traffic volume on the one or more routes.

The server 110 may send the traffic data to the mobile device 104 or the mobile device 104 may collect the traffic data directly. In some embodiments the server 110 calculates the surprise factor for the one or more routes from the historical traffic data and the real time traffic data. The database 108 or local memory is accessed for data that represent average traffic speed, average traffic volume, or some combination thereof for the one or more routes. The server 110, or in some embodiments the mobile device 104, is configured to send a surprise traffic message to the mobile device 104. The message may display an indicator of congestion on the one or more routes. In some embodiments, the server 110 calculates a traffic level surprise (TLS) on route I to j at time t, according to Equation 1.

$$TLS_{ij}(t)=|1-SF_{ij}(t)| \quad \text{Eq. 1}$$

The term $$SF_{ij}(t) = \frac{L_{ij}(t)}{L_{ij}^h(t)}$$

may be referred to as the surprise factor on the route i to j at time t, $L_{ij}(t)$ is the average traffic level on a particular route from i to j at time t, and $L_{ij}^h(t)$ is the historic average traffic level on a particular route from i to j at time t. In some embodiments the traffic level surprise corresponds to the speed at which vehicles travel on the one or more routes. In other embodiments the traffic level surprise corresponds to the volume of traffic on the one or more routes. In some embodiments the traffic level surprise may be calculated according to Equation 2:

$$TLS_{ij}(t)=|L_{ij}(t)-L_{ij}^h(t)| \quad \text{Eq. 2}$$

$L_{ij}(t)$ is the real time average traffic level on a particular route from i to j at time t, and $L_{ij}^h(t)$ is the historic average traffic level on a particular route from i to j at time t. In some embodiments the traffic level surprise corresponds to the speed at which vehicles travel on the one or more routes. In other embodiments the traffic level surprise corresponds to the volume of traffic on the one or more routes.

In an embodiment, the traffic level surprise may be compared against a threshold value. The threshold value may correspond to a historical traffic level for the one or more routes. The threshold value may represent the speed at which vehicles travel along the one or more routes. The threshold value may also represent the volume of vehicles traveling along the one or more routes. The traffic level surprise may be higher or lower than the historical level for the one or more routes. In the event the traffic level surprise is higher than the historic level it may represent a positive traffic level surprise. For example, if the average speed at which vehicles are traveling at on the one or more routes is faster than the historical average speed at which vehicles are traveling on the one or more routes this would be a positive outcome. This may indicate a low level of congestion on the one or more routes. Conversely, for example, if the traffic level surprise represents the volume of vehicles traveling along the one or more routes and it is higher than the historical volume of vehicles that travel along the one or more routes this may indicate a high level of congestion. In other embodiments the traffic level surprise measures a combination of speed and volume. In some embodiments the comparison is performed by the server 110. In other embodiments the comparison is performed by the mobile device 104.

The threshold value may be based on the average speed on a particular route. For example, the historical average speed on the particular route may be 42 miles per hour. In that case, if the real time average speed on the particular route is actually 56 miles per hour this would correspond to a positive surprise factor. Alternatively, the threshold value may be different depending on the type of route that is being traveled. For example, if a user is driving along a city street and the real time average speed of the street is 5 miles per hour faster than the historical average speed along that street this may be a positive surprise factor. However, if the user is driving along an interstate highway 5 miles per hour faster than the historical average along that interstate highway this may not correspond to a positive surprise factor, because the threshold for interstate highways may be set for a positive surprise factor to require at least 10 miles per hour faster than the historical average speed.

The server 110, or in some embodiments the mobile device 104, is configured to generate a surprise traffic message based on the comparison. The surprise traffic message may be an indication of congestion, or lack thereof, on the one or more routes. This congestion, or lack thereof, may be an indicating of a faster or slower average vehicle speed on the one or more routes, or a higher or lower volume of vehicles on the one or more routes.

The surprise traffic message may be sent by the server 110 to the mobile device 104. In other embodiments the mobile device sends the surprise traffic message to the server. The surprise traffic message may be presented to a user of the mobile device as a filter on a map viewed on their mobile device. The filter may operate to only display information that is a part of the filter on the map. In one embodiment, the surprise traffic message would display on the map. For example, the user may turn on the surprise factor filter when looking at the map on the mobile device and the mobile device may only display the one or more routes that are presently undergoing surprise congestion as indicated by the existence of a surprise factor above or below a threshold.

In another embodiment, the surprise traffic message may be displayed for the one or more routes in an origin destination matrix. An origin destination matrix is used by traffic planners and other traffic professionals for observing, monitoring, and modeling traffic flows in a region. The origin destination matrix may include a grid where each cell in the grid corresponds to a particular origin destination pair. The surprise traffic message may indicate that there is a traffic surprise in a cell in the origin destination matrix. One such example origin destination matrix with traffic surprises displayed is shown in FIG. 4.

Another use for traffic surprise may be a combination of traffic surprise speed and traffic surprise volume for master traffic flow surprise. This may be proportional to a measurement of 'flow' surprise. One way of representing traffic flow may be where traffic flow is equal to speed times volume on a route, or section. Therefore flow surprise may be calculated according to Equation 3.

$$TFS(t) = TSS(t) \times TVS(t) \qquad \text{Eq. 3}$$

TSS(t) is the traffic surprise speed at time t, and TVS(t) is the traffic volume surprise at time t.

The data collected and calculated by the system may be published to the public as part of an application programming interface, or "API," where users of the API may build their own applications using the data published. In one embodiment, the data may be published according to the following formulas:

⟨$S_{ij}(t)$, $SF_{ij}^s(t)$⟩—Publishing traffic speed and its surprise factor,

⟨$V_{ij}(t)$, $SF_{ij}^v(t)$⟩—Publishing traffic volume and its surprise factor, ⟨$S_{ij}(t)$, $JF_{ij}(t)$, $SF_{ij}^s(t)$⟩—Publishing traffic speed and jam factor and its surprise factor, ⟨$TSS_{ij}(t)$, $TVS_{ij}(t)$⟩—Publishing magnitude of surprise in speed and volume dimension, and ⟨$SF_{ij}^s(t)$⟩—Publishing traffic speed surprises only with the ability to know if it is negative or positive. By the use of the API, the customers of traffic service providers would have the choice of fetching the traffic information as they saw fit.

The mobile device 104 may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The developer system 102 and the mobile device 104 are coupled with the network 106. The phrase "coupled with" is defined to mean directly connected to or indirectly connected through one or more intermediate components. Such intermediate components may include hardware and/or software-based components.

Computing resources for monitoring and visualizing traffic surprises may be divided between the server 110 and the mobile device 104. In some embodiments, the server 110 performs a majority of the processing for calculating image based routing and confirmation. In other embodiments, the mobile device 104 performs a majority of the processing. In addition, the processing is divided substantially evenly between the server 110 and the mobile device 104.

Figure 2:
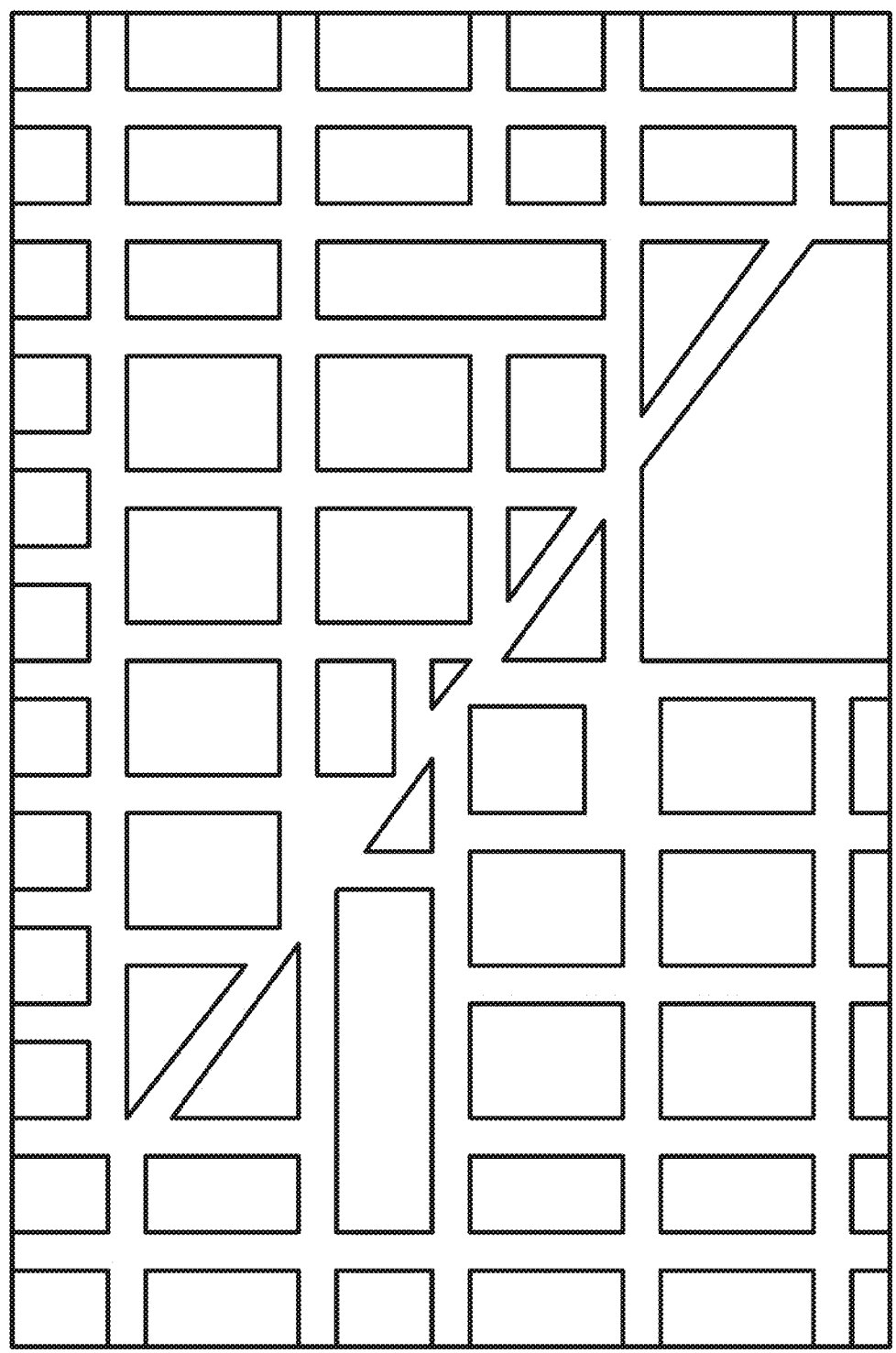
FIG. 2 illustrates an example overhead map of a region of interest.
Figure 3:
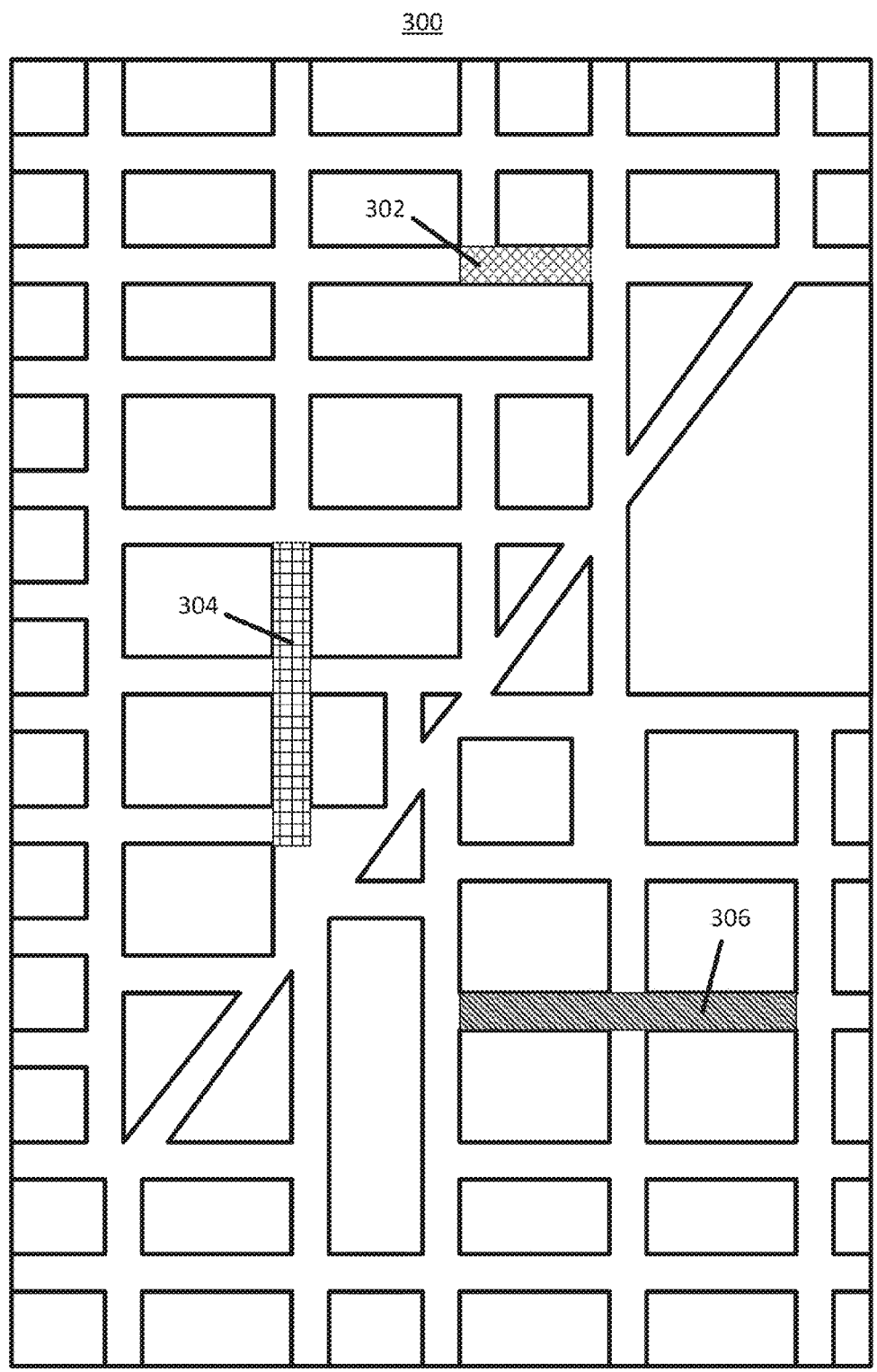
FIG. 3 illustrates an example overhead map of a region of interest with traffic surprises mapped onto routes on the map.

FIGS. 2 and 3 illustrate example displays of map views with and without overlaid surprise factors. The images of FIGS. 2 and 3 may correspond to the map views presented on a mobile device such as the mobile device 104 of FIG. 1. The term map views may refer to terrestrial images taken from the ground or near the ground (i.e., not aerial images or satellite images). Alternatively, map views may refer to aerial images or satellite images.

The map views may consist of road maps, street maps, topographical maps, graphical maps, geographic information system maps, maps of the built environment (e.g., maps showing buildings in terms of elevation), or some combination thereof. The map views may be presented automatically by the server 110 or in some embodiments the mobile device 104. Alternatively, the map views may be selected by a user of the system 100.

FIG. 2 illustrates an example map view 200 that may be presented during operation of the system 100. In the example shown, a user 202 of a mobile device, such as the mobile device 104 of FIG. 1. The example map view may portray a region of interest, roads, routes, road segments, or any combination thereof. Additionally, the map view may also portray user specified locations, landmarks, user designated locations, and other points of interest.

FIG. 3 illustrates an example map view 300 with the system displaying one or more traffic surprises on the map view 200 from FIG. 2. The traffic surprises may indicate congestion of varying levels on the map view. The traffic surprises may be displayed on the map view in a variety of manners, such as different shading or cross-hatching as shown on map view 300. Alternatively, the traffic surprises may be shown by different colors indicating the varying levels of congestion compared to the historical levels of congestion. In the example shown, the system is displaying a traffic surprise 302 on a segment of road which may represent relatively medium congestion compared to the historical level of congestion. The traffic surprise 304 may represent relatively light congestion compared to the historical level of congestion. The traffic surprise 306 may represent relatively heavy congestion compared to the historical level of congestion.

FIG. 4 illustrates an example origin destination matrix 400 that utilizes the traffic surprise information calculated by the system. An origin destination matrix may be a representation of a transportation network, which captures the journey-time or travel-time it takes to move from one location (origin) to the other (destination) and the volume of vehicles traversing from these origins to destinations. Origin destination matrices may be useful to traffic planners, city planners, traffic specialists, or other users which may derive value from high level traffic tracking. The origin destination matrix 400 may display a list of origins and potential destinations 402, as well as varying levels of traffic surprises 404-410. The list of origins and destinations 402 may correspond to one or more routes displayed on the example map view 200. Alternatively, the potential origins and destinations may correspond to regions of interest, cities, or points of interest.

The varying levels of traffic surprises 404-410 displayed on the origin destination matrix may correspond to varying levels of congestion from low levels of congestion to high levels of congestion. A user may use the traffic surprise data, and traffic surprise messages in the following manner. In the origin destination matrix 400 shown the "X"s correspond to the lack of an origin destination pair. This is because in the origin destination matrix shown an "X" corresponds to the same origin and destination. For example, row 1, column 1, of the origin destination matrix shows "aje st" as the origin and destination and accordingly an "X" is placed to indicate this is not a valid origin destination pair. Similarly, a "G," as shown at traffic surprise 404, in column 3 row 8, may correspond to a very positive traffic surprise (i.e., traffic is moving much faster than should be expected) for that particular origin destination pair. A "Y," as shown at traffic surprise 406, in column 5 row 2, may correspond to a slightly negative traffic surprise (i.e., traffic is moving somewhat slower than should be expected) for that particular origin destination pair. Similarly, an "R," as shown at traffic surprise 408, in column 6 row 4, may correspond to a fairly negative traffic surprise (e.g., traffic is moving slower than should be expected) for that particular origin destination pair. A "B," as shown at traffic surprise 410, in column 6 row 7, may indicate a very negative traffic surprise (e.g., traffic is moving much slower than should be expected) for that particular origin destination pair. Alternatively, the traffic surprises may be displayed on the origin destination matrix using a series of colors, such as green, yellow, red, black, white, or other colors, to indicate the different levels of traffic surprise. For example, the traffic surprises in the origin destination matrix may correspond to varying speed levels on the origin destination pairs, such as the table below:

| | | |
|---|---|---|
| 1.0 < SF | → | Green |
| 0.5 < SF < 1.0 | → | Yellow |
| 0.1 < SF < 0.5 | → | Red |
| 0.1 > SF | → | Black |

Where Green indicates that there is a significantly positive traffic surprise as the current traffic situation is better than the expected. Yellow means a slightly negative surprise. Red means a significantly negative surprise. Black means a hugely negative surprise due to, for example, a traffic jam or road-block.

The traffic surprises presented in the origin destination matrix 400 may be generated according to Equation 4.

$$OD_{ij}(t)=M_{ij}(TTS(t)) \qquad \text{Eq. 4}$$

$OD_{ij}(t)$ is the origin destination from location i to location j at time t, $M_{ij}$ is the matrix from location i to location j, and TTS(t) is Travel Time Surprise at time t. The Travel Time Surprise may be the historical average travel time divided by the current travel time from location i to j. In another embodiment, the origin destination matrix 400 may be generated according to Equation 5.

$$OD_{ij}(t)=M_{ij}(TSQ(t)) \qquad \text{Eq. 5}$$

TSQ(t) is the Travel Speed Quotient at time t. The Travel Speed Quotient may be the free flow travel time divided by the travel time at time t. This may be useful for transportation planners to compare the travel time during the day versus the travel time at night, where the travel time during the day is expected to be higher. In another embodiment the traffic surprises presented in the origin destination matrix 400 may be generated according to Equation 6.

$$OD_{ij}(t)=M_{ij}(VS(t)) \qquad \text{Eq. 6}$$

VS(t) is the Volume Surprise at time t. The Volume Surprise may be the current volume from location i to location j divided by the historical average volume from location i to location j. The origin destination matrix 400 may be a time-of-week dependent origin destination matrix for every epoch of the week (e.g., weekoch). Assuming the size of an epoch is 30 mins, then a day has 48 epochs and a week has 7 times 48 epochs. This would allow for unique and accurate origin destination matrix representation of transportation network for different time of the week. In other embodiments the traffic surprises generated for the origin destination matrix may be calculated according to a combination of the formulas presented above.

Figure 5:
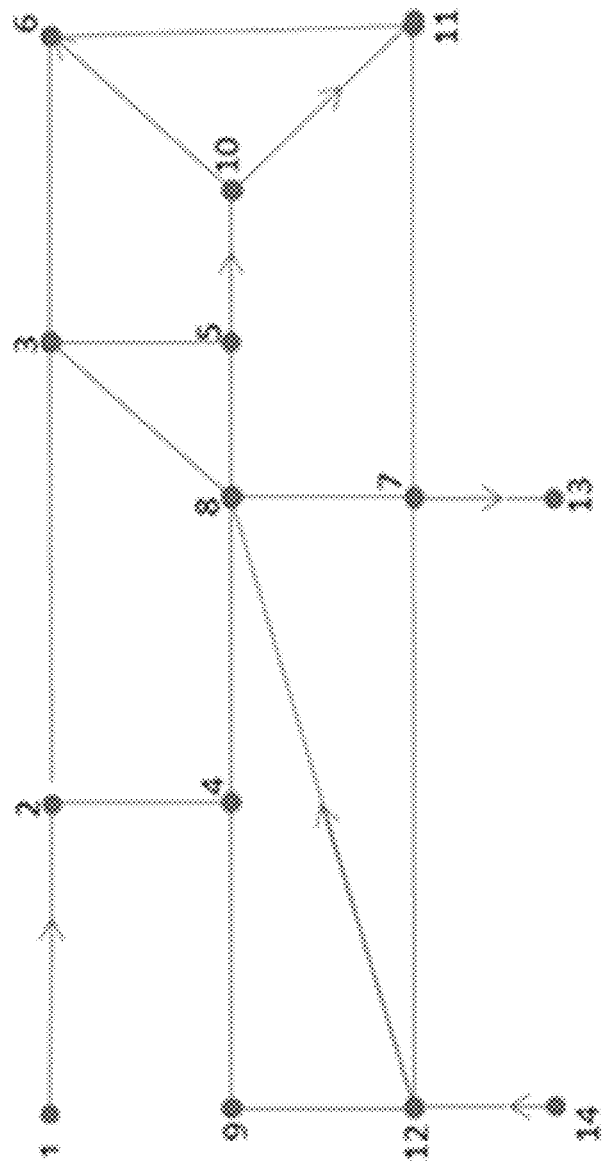
FIG. 5 illustrates an example node network.
Figure 6:
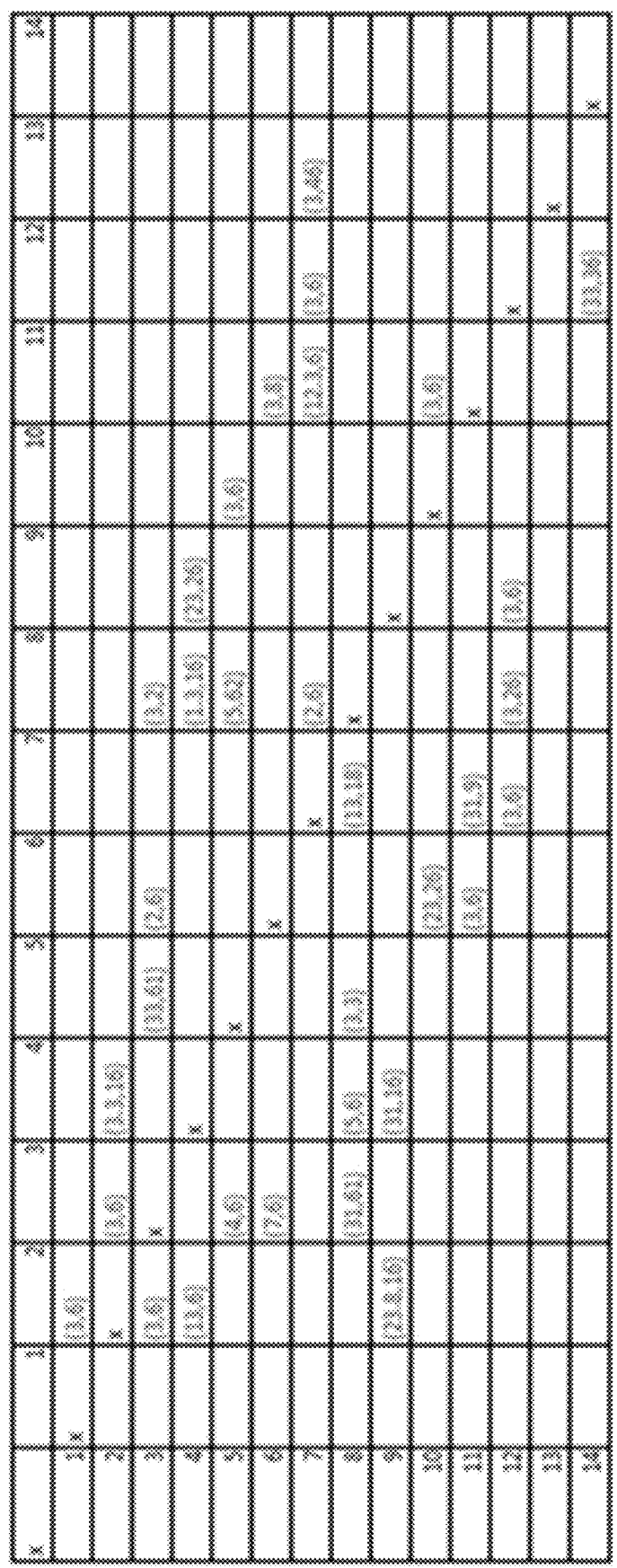
FIG. 6 illustrates an example origin destination matrix showing travel-time and volume information for the example node network of FIG. 5.
Figure 7:
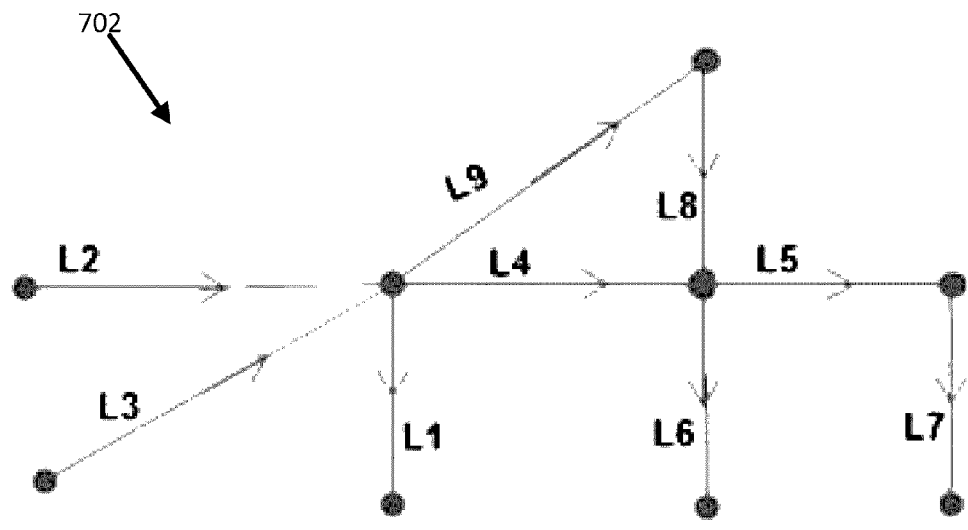
FIG. 7 illustrates an example origin destination matrix based on links in a network.

FIGS. 5, 6, and 7 illustrate alternative origin destination matrices and node networks which may be used for building an origin destination matrix. FIG. 5 is an example 14 node network. The 14 nodes in FIG. 5 may correspond to the origins and destinations listed in FIG. 6. FIG. 6 is an example origin destination matrix using the 14 node network of FIG. 5 which shows the average travel time and average vehicle count from location I to location j at time t. The origin destination matrix may be calculated according to Equation 7, where tt is the average travel time and k is the average vehicle count that moves from origin i to destination j at departure time t.

$$OD_{ij}(t)=M_{ij}(tt,k) \qquad \text{Eq. 7}$$

FIG. 7 illustrates an example node network 702 based on links in a network and a corresponding origin destination matrix 704. For example, when the system builds the node network 702 it may consider all possible origin destination intersections based on the links within the network beyond the immediate neighboring link. The links may be preprocessed by the system with the assumption that most of traffic surprises may occur on the links. In the origin destination matrix 704, a "1" may indicate the existence of a traffic surprise, whereas a "0" may indicate the absence of traffic surprises.

Figure 8:
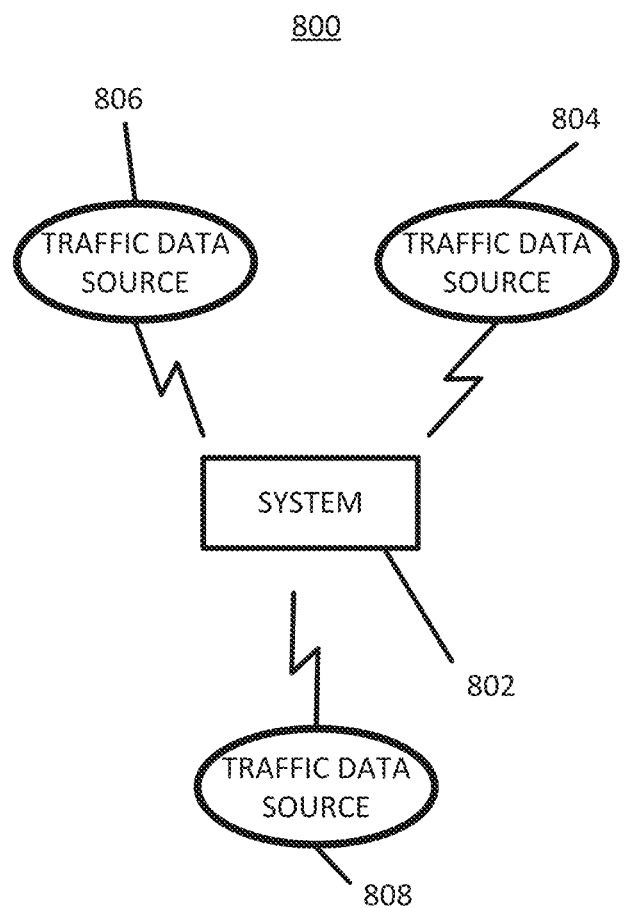
FIG. 8 illustrates an example set of traffic data sources.

FIG. 8 illustrates an example set of one or more potential traffic data sources 804-808 that may be used by the system 802 to collect, analyze, store, and determine historical traffic data and real time traffic data. The potential traffic data sources may be probes, mobile devices, vehicles, traffic service providers, stationary detectors, traffic data databases or some combination thereof. Stationary detectors may include inductive directions positioned in the roadway or adjacent to the roadway.

Figure 9:
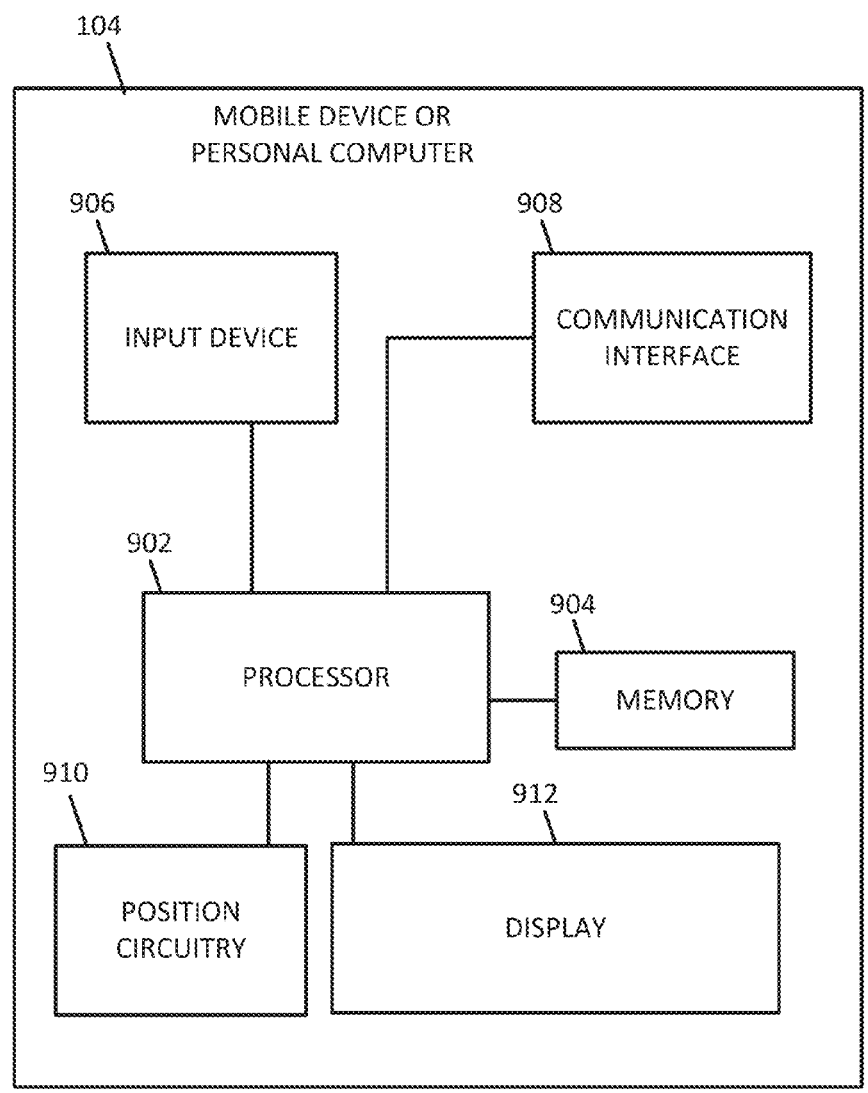
FIG. 9 illustrates an example mobile device.
Figure 10:
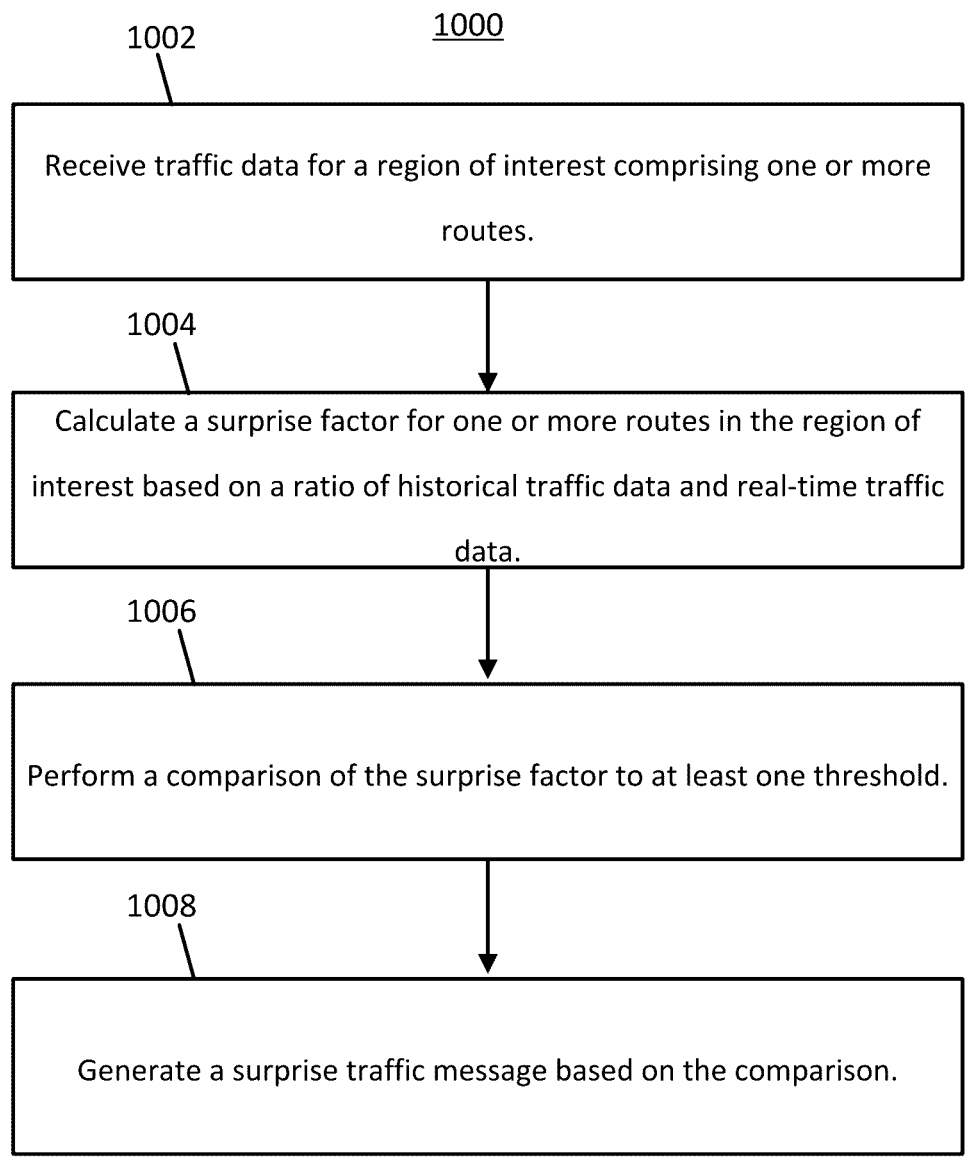
FIG. 10 illustrates an example flowchart for monitoring and visualizing traffic surprises.

FIG. 9 illustrates an exemplary mobile device 104 of the system of FIG. 1. The mobile device 104 includes a processor 902, a memory 904, an input device 903, a communication interface 908, position circuitry 910, and a display 912. Additional, different, or fewer components are possible for the mobile device/personal computer 104. FIG. 10 illustrates an example flowchart for monitoring and visualizing traffic surprises and confirmation. The acts may be applied in a different order. Acts may be omitted or repeated. Additional acts may be added. The memory 904 may store the historical traffic data, real time traffic data, past traffic surprises, or some combination thereof. The mobile device 104 may be a personal device such as a mobile phone equipped with position circuitry (e.g., global positioning system (GPS)) and an inertial measurement unit (IMU).

The position circuitry 910 generates data indicative of the location of the mobile device 104 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

At act 1002, the processor 902 or the communication interface 908 may be configured to receive traffic data for a region of interest comprising one or more routes. The data may be collected by the position circuitry 910, the input device 906, a GPS, or other collection device integrated with the mobile device 104. The subsequent traffic data may be any one or combination of a destination, vehicle speed, volume of vehicles on a route, GPS coordinates, previously stored location, user-supplied location, or other type of traffic data. At act 1004, the processor 902 calculates a surprise factor for one or more routes in the region of interest based on a ratio of historical traffic data and real-time traffic data. The surprise factor may be calculated according to any of the formulas listed above.

At act 1006, the processor 902 performs a comparison of the traffic surprise to a threshold. The processor may perform this step in conjunction with the memory 904. The threshold may be predetermined by the system, the user, or a third party, or some combination thereof. The threshold may be entered into the system by the user through the use of the input device 906.

At act 1008, the processor 902 generates a surprise traffic message based on the comparison. The surprise traffic message may be indicative of a traffic surprise on one or more routes based on travel time, vehicle volume, or some combination thereof. In some embodiments, the surprise traffic message may be presented to a user of a mobile device on the display 912.

In one embodiment the traffic surprise information may be used by an assisted driving protocol, program, or vehicle. The program may take into account the surprise factor information by receiving from the communication interface 908 surprise factor information along a route that the vehicle is traveling. Additionally, the program may then communicate this information to the rider in the vehicle by use of the display 912.

Assisted driving vehicles include autonomous vehicles, highly assisted driving (HAD), and advanced driving assistance systems (ADAS). Any of these assisted driving systems may be incorporated into mobile device 104. Alternatively, an assisted driving device may be included in the vehicle. The assisted driving device may include memory, a processor, and systems to communicate with the mobile device 104.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the traffic surprise level or surprise factor.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the traffic surprise level or surprise factor for a current or upcoming road link.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic surprise level or surprise factor of a current or upcoming road link.

In another embodiment, the traffic surprise information may be used by a routing program as it calculates the route to travel from a start and end point. The routing program may compare possible routes using the surprise factor. The traffic surprise information calculated for segments the route during the routing process may then be reported to the user via a surprise traffic message displayed via the display 912.

Figure 11:
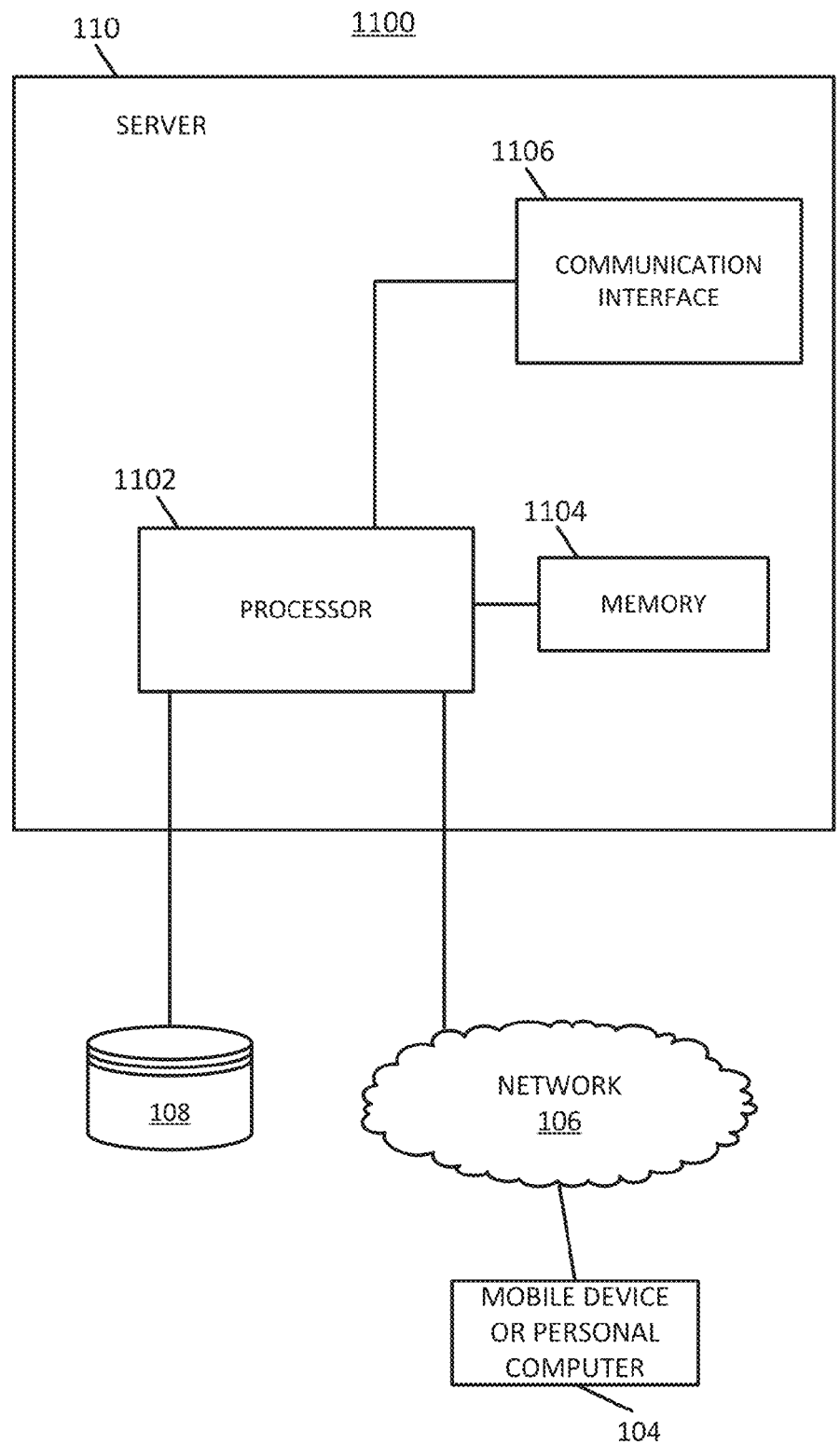
FIG. 11 illustrates an example server arrangement for monitoring and visualizing traffic surprises.
Figure 12:
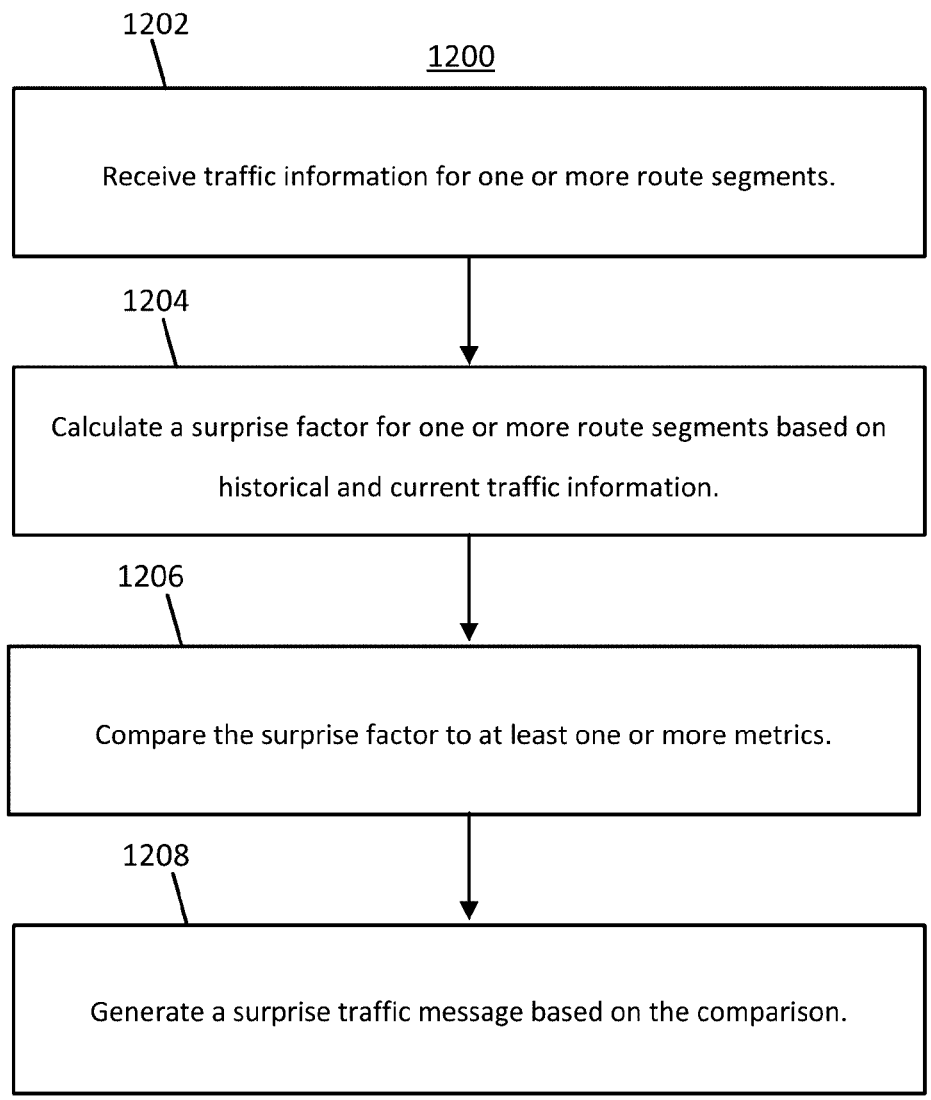
FIG. 12 illustrates an example flowchart for monitoring and visualizing traffic surprises.

FIG. 11 illustrates an example network device (e.g., server 110) of the system of FIG. 1. The server 110 includes a processor 1102, a communication interface 1106, and a memory 1104. The server 110 may be coupled to a database 108 and a mobile device 104. The mobile device 104 may be used as an input device for the server 110. In addition, the communication interface 1106 is an input device for the server 110. In certain embodiments, the communication interface 1106 may receive data indicative of user inputs made via the mobile device 104. FIG. 12 illustrates an example flowchart for monitoring and visualizing traffic surprises. The acts of the flowchart of FIG. 12 may alternatively be performed by the server 110, or a group of servers. Different, fewer, or additional acts may be included.

At act 1202, the processor 1102 or communication interface 1106 receives traffic information for one or more route segments through a network 106. At act 1204, the processor 1102 calculates a surprise factor for one or more route segments based on historical traffic information and real time traffic information. The one or more route segments may be determined by the processor 1102, determined by a route preference stored in the memory 1104 corresponding to the particular user device 104, or may be a route selected by a user.

At act 1206, the processor 1102 compares the surprise factor to one or more metrics. The metrics may be predetermined, user determined, or some combination thereof. The metrics may correspond to traffic volume, traffic speed, travel time, or some combination thereof.

At act 1208, the processor 1102 generates a surprise traffic message based on the comparison. The surprise traffic message may be indicative of a traffic surprise on one or more route segments based on travel time, vehicle volume, or some combination thereof. In some embodiments, the processor 1102 or communication interface 1106 sends to the user device 104 the surprise traffic message. The system may update the database with the surprise traffic database, making necessary changes to entries in a table in a database.

In addition to the data describe above, the database 108 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 108 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 108 may include data about the POIs and their respective locations in the POI data records. The database 108 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 108 can include event data (e.g., traffic incidents, constructions, scheduled events, unscheduled events, etc.) associated with the POI data records or other records of the database 108.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 108 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 902 and/or the server processor 1102 may include a general processor, digital signal processor, an application specific integrated circuit (ASIC), field programmable gate array (FPGA), analog circuit, digital circuit, combinations thereof, or other now known or later developed processor. The mobile device processor 902 and/or the server processor 1102 may be a single device or combinations of devices, such as associated with a network, distributed processing, or cloud computing. The computing device processor 902 and/or the server processor 1102 may also be configured to cause an apparatus to at least perform at least one of methods described above.

The memory 904 and/or memory 1104 may be a volatile memory or a non-volatile memory. The memory 904 and/or memory 1104 may include one or more of a read only memory (ROM), random access memory (RAM), a flash memory, an electronic erasable program read only memory (EEPROM), or other type of memory. The memory 904 and/or memory 1104 may be removable from the mobile device 104, such as a secure digital (SD) memory card.

The communication interface 908 and/or communication interface 1106 may include any operable connection. An operable connection may be one in which signals, physical communications, and/or logical communications may be sent and/or received. An operable connection may include a physical interface, an electrical interface, and/or a data interface. The communication interface 908 and/or communication interface 1106 provides for wireless and/or wired communications in any now known or later developed format.

In the above described embodiments, the network 106 may include wired networks, wireless networks, or combinations thereof. The wireless network may be a cellular telephone network, an 802.11, 802.16, 802.20, or WiMax network. Further, the network 106 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving traffic data for a plurality of vehicles for a region of interest comprising one or more routes, wherein the traffic data for each vehicle of the plurality of vehicles includes position data derived from a global positioning system and traffic speed data;
   calculating real-time traffic flow data from the traffic data for one or more routes in the region;
   identifying historical traffic flow data;
   calculating, by a processor, a surprise factor for the one or more routes in the region of interest based on a ratio of the historical traffic flow data and the real-time traffic flow data;
   performing, by the processor, a comparison of the surprise factor to at least one threshold;
   generating, by the processor, a surprise traffic message based on the comparison; and
   transmitting, by the processor, the surprise traffic message to one or more navigation devices.

2. The method of claim 1 wherein the at least one threshold for the surprise factor indicates that the real-time traffic flow data is faster than predicted from the historical traffic flow data.

3. The method of claim 1 wherein the at least one threshold for the surprise factor indicates that the real-time traffic flow data is slower than predicted from the historical traffic flow data.

4. The method of claim 1 where the one or more routes comprise an origin and a destination.

5. The method of claim 4, further comprising:
   presenting one or more surprise traffic messages in an origin destination matrix using the origin and destination of the one or more routes.

6. The method of claim 5, wherein calculating further comprises:
   calculating the surprise factor for one or more origin destination pairs in the origin destination matrix.

7. The method of claim 1, wherein a traffic level (TLS) is based on the surprise factor (SF) and calculated according to the following formula:

$$TLS_{ij}(t) = |1 - SF_{ij}(t)|;$$

where $$SF_{ij}(t) = \frac{L_{ij}(t)}{L_{ij}^h(t)};$$

where $L_{ij}(t)$ is an average traffic level on a particular route from i to j at time t; and
where $L_{ij}^h(t)$ is a historic average traffic level on a particular route from i to j at time t.

8. The method of claim 1, wherein the surprise factor (TLS) is calculated according to the following formula:

$$TLS_{ij}(t) = |L_{ij}(t) - L_{ij}^h(t)|;$$

where $L_{ij}(t)$ is an average traffic level on a particular route from i to j at time t; and
where $L_{ij}^h(t)$ is a historic average traffic level on a particular route from i to j at time t.

9. An apparatus comprising:
   at least one processor; and
   at least one memory including computer program code for one or more programs; the at least one memory and the computer program code configured to, with the at least one processor, cause the apparatus to at least perform:
   receive traffic information for a plurality of vehicles for one or more route segments wherein the traffic information includes position data derived from a global positioning system and traffic speed data;
   calculate current traffic flow conditions from the traffic information for the plurality of vehicles;

calculate a surprise factor for one or more route segments as a function of a ratio of historical and current traffic flow conditions;

calculate an origin and destination matrix for the one or more route segments, and a corresponding surprise factor for each of a plurality of origin destination pairs in the origin and destination matrix; and transmit, by the processor, the origin destination matrix including traffic flow conditions for the plurality of origin destination pairs that have a surprise factor that exceeds a predetermined threshold.

10. The apparatus of claim 9, wherein the computer program code configured to, with the at least one processor, cause the apparatus to:

display the origin destination matrix.

11. The apparatus of claim 9, wherein the computer program code configured to, with the at least one processor, cause the apparatus to:

send the origin destination matrix to a device.

12. The apparatus of claim 9, wherein the current traffic flow conditions are calculated using traffic volume and traffic speed derived from the received traffic information.

13. The apparatus of claim 9, wherein the computer program code configured to, with the at least one processor, cause the apparatus to:

receive a request for a route from an origin to a destination;

generating the route including a plurality of route segments of the one or more route segments; and transmit the route including only the surprise factor for any of the plurality of route segments that exceeds a threshold.

14. A non-transitory computer readable medium comprising instructions that when executed are operable to:

calculate a plurality of routes including a plurality of route segments from a plurality of origins to a plurality of destinations;

receive traffic data including an average traffic level and a historical average traffic level for the plurality of route segments in a designated region;

calculate a traffic level (TLS) for each of the plurality of routes based on a surprise factor (SF) and calculated according to the following formula:

$$TLS_{ij}(t) = |1 - SF_{ij}(t)|;$$

where $$SF_{ij}(t) = \frac{L_{ij}(t)}{L_{ij}^h(t)};$$

where $L_{ij}(t)$ is the average traffic level on a particular route from i to j at time t;

where $L_{ij}(t)$ is the historic average traffic level on a particular route from i to j at time t;

generate an origin destination matrix for the plurality of routes from the plurality of origins to the plurality of destinations using the traffic level (TLS) for the plurality of routes; and transmit the origin destination matrix to a navigation device.

15. The non-transitory computer readable medium of claim 14, wherein the instructions are configured to:

calculate the surprise factor based on real time traffic flow data and historical traffic flow data.

16. The non-transitory computer readable medium of claim 14, wherein the surprise factor is compared to at least one threshold including a first level for faster than expected traffic and a second level for slower than expected traffic.

17. The non-transitory computer readable medium of claim 14, wherein the instructions are configured to:

receive a request for a route of the plurality of routes segments; and transmit route traffic data including only the surprise factor for any of the plurality of route segments that exceeds a threshold.

* * * * *